Aug. 16, 1960    H. H. MANNING    2,948,962
PLIERS
Filed Dec. 24, 1958

INVENTOR.
Howard H. Manning
BY Ralph Hanna
Attorney

United States Patent Office 2,948,962
Patented Aug. 16, 1960

2,948,962
PLIERS

Howard H. Manning, Meadville, Pa., assignor to Champion De Arment Tool Company, Meadville, Pa., a corporation of Pennsylvania Filed Dec. 24, 1958, Ser. No. 782,791

1 Claim. (Cl. 30—186)

This invention is a heavy duty lineman's pliers having the required rigidity and leverage for cutting hard drawn copper wire without the increased weight which would accompany the mere increase in size of conventional pliers. Increased leverage is obtained by offsetting the pivot closer to the cutting edges of the jaws. The increased rigidity is obtained by guide surfaces on the side of the pivot remote from the jaws and straddling at least one of the crossed plier members.

While offsetting of the pivot towards the cutting edges of the jaws does increase the leverage desirable for cutting harder wire, it at the same time cuts down the resistance of the pliers to lateral shifting of the cutting edges. The straddling guide surfaces restore the resistance to lateral shifting of the jaws. Because of the mechanical advantage, the guide surfaces also permit the use of a smaller diameter rivet or pivot pin for the jaws.

Figure 1:
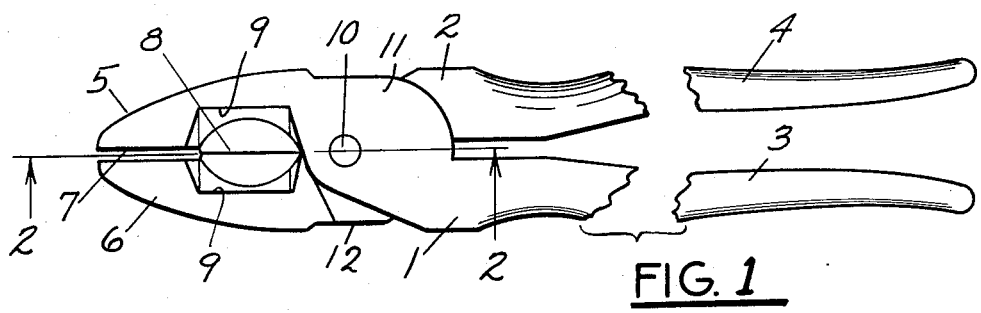
Figure 2:
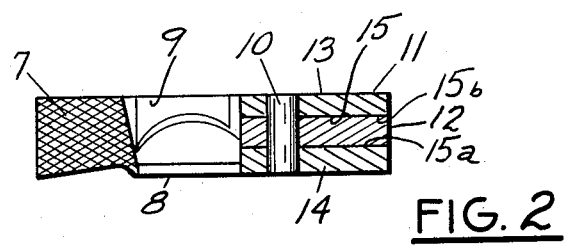
Figure 3:
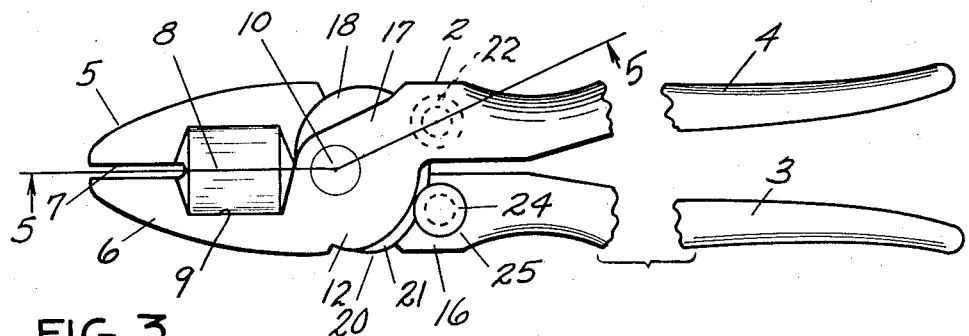
Figure 5:
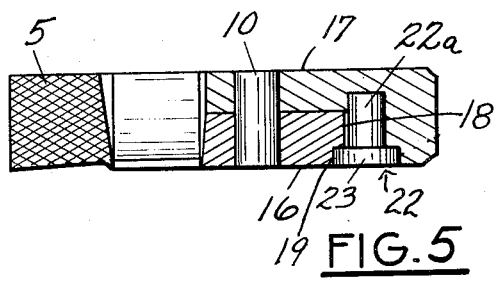
Figure 4:
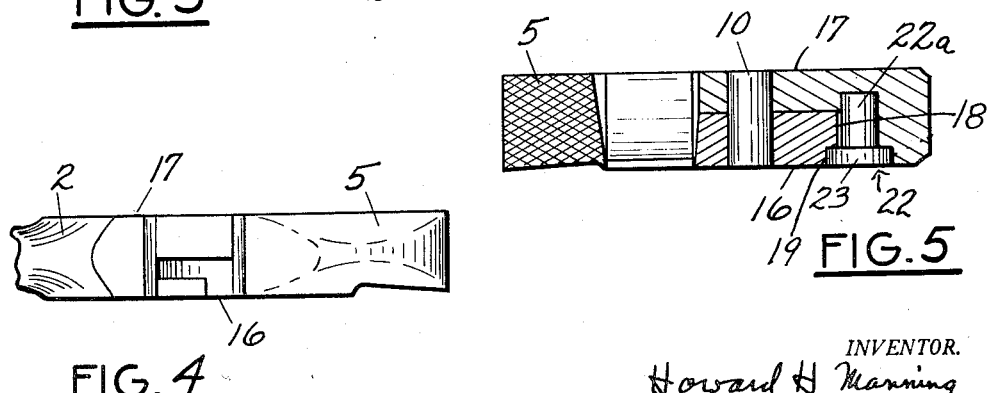

In the drawing, Fig. 1 is a plan view of a heavy duty pliers; Fig. 2 is a section on line 2—2 of Fig. 1; Fig. 3 is a plan view of a modification of the pliers; Fig. 4 is an edge view; and Fig. 5 is a section on line 5—5 of Fig. 3.

The conventional parts of lineman's pliers will be readily identified, 1 and 2 being the crossed members respectively having handles 3 and 4 at one end and jaws 5 and 6 at the other end. At the outer ends, the jaws have wire gripping surfaces 7 and at the inner ends the jaws have cutting edges 8 at the bottom of opposed recesses 9. The parts so far described are of common construction.

In the usual lineman's pliers, the cross sections of the members 1 and 2 lie one on top of the other and are pivoted by a rivet fixed centrally in the cross section of one of the members and having an enlarged head overlying the cross section of the other of the members. The rivet head provides the sole force holding the cutting edges of the jaws in alignment with the result that in time the cutting edges tend to become laerally offset due to the cutting and twisting forces encountered during use.

In the present pliers, where the pivot pin or rivet 10 is eccentrically located in the cross sections 11 and 12 of the pliers in order to obtain the additional leverage needed for cutting hard drawn copper wire, a mere rivet head would not be adequate to hold the cutting edges 8 in alignment. First, the restricted space permits only a relatively small rivet head. Furthermore, the location of the rivet close to the cutting edges gives the rivet head very little mechanical advantage for holding the cutting edges in alignment. The location of the rivet, while desirable for providing the additional leverage needed for cutting hard wire, is undesirable from the point of view of holding the cutting edges in alignment.

In the present pliers, the cross section 11 of the plier member 1 has upper and lower walls 13 and 14 providing a slot 15 for receiving and guiding the cross section 12 of the plier member 2. With this construction, even though the pin 10 is eccentrically located adjacent the cutting edges of the jaws, the cutting edges are held in alignment by the extended guiding surfaces 15a, 15b remote from the pin 10 and adjacent the handles 3 and 4. The remote guiding surfaces have the additional mechanical advantage required to hold the cutting edges in alignment under the heavier than normal cutting forces developed because of the eccentric location of the pin 10.

In Figs. 3, 4, and 5, is shown the modification which likewise has guide surfaces remote from the cutting edges for holding the cutting edges in alignment. Corresponding parts of the pliers are indicated by the same reference numerals.

The principal difference in the construction of the pliers is at the cross sections 16 and 17 of the plier members 1 and 2 which are symmetrically constructed and lie one on top of the other as shown in Figs. 4 and 5. On the inner side of the section 16 of the plier member 1 there is an arcuate rib 18 which projects radially beyond an arcuate surface 19. Both the rib 18 and the surface 19 are concentric with the pin 10. The section 17 of the plier member 2 has a similar arcuate rib 20 and arcuate surface 21 likewise centered on the pin 10.

In order to hold the cross sections 16 and 17 of the plier members in contact with each other and to thereby prevent lateral offsetting of the cutting edges 8 of the jaws, a pin 22 has a shank 22a fixed in the cross section 17 of the plier member 2. The pin has a head 23 which overlies the arcuate rib 18 and which bears against the arcuate surface 19 on the cross section 16 of the plier member 1. The pin 22 is remote from the pin 10 and from the cutting edges 8 and is in position to have the greatest possible mechanical advantage for preventing twisting of the cutting edges 8 out of alignment. A similar pin 24 is fixed to the cross section 16 of the plier member 1 and has a head 25 overlying the rib 20 and bearing against the arcuate surface 21.

In both forms of pliers, the pivot pin 10 is eccentrically located to produce the desirable additional leverage for cutting hard wire and because there are guide surfaces on opposite sides of at least one of the cross members, the cutting edges of the jaws are held in alignment even under the heavier cutting forces of which the pliers are capable.

What is claimed as new is:

Heavy duty pliers having a pair of members each with a cross section intermediate the ends and each having a handle at one side of its cross section and having on the other side of its cross section a jaw with a cutting edge, a pivot for the members at right angles to and displaced eccentrically in said cross sections toward the jaws to provide increased leverage for cutting, the cross sections having guide surfaces remote from the pivot and the jaws for preventing tilting of the members about an axis at right angles to the pivot and thereby holding the cutting edges in alignment, said guide surfaces comprising an arcuate rib concentric with the pivot and projecting radially from the cross section of one member on the side of the pivot adjacent the handle, and a pin having a shank fixed in the other of said members and having a head spaced from said other member and overlapping said rib.

References Cited in the file of this patent

UNITED STATES PATENTS

| 648,224 | Triolo | Apr. 24, 1900 |
| 723,356 | Bayrer | Mar. 24, 1903 |
| 888,606 | Gemeny | May 26, 1908 |
| 975,385 | Chappel | Nov. 8, 1910 |
| 2,746,145 | Klein et al. | May 22, 1956 |